US009268604B1

(12) United States Patent
Herzberg et al.

(10) Patent No.: US 9,268,604 B1
(45) Date of Patent: Feb. 23, 2016

(54) AUTOMATED ALLOCATION OF VEHICLE SYSTEMS FOR DIFFERENT SPECIFIED VEHICLE TESTING TASKS

(71) Applicant: The Boeing Company, Chicago, IL (US)

(72) Inventors: Garry Herzberg, Renton, WA (US); Maykel Garas, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 389 days.

(21) Appl. No.: 13/710,906

(22) Filed: Dec. 11, 2012

(51) Int. Cl.
*G06F 9/46* (2006.01)
*G06F 9/50* (2006.01)

(52) U.S. Cl.
CPC .................................... *G06F 9/50* (2013.01)

(58) Field of Classification Search
CPC ............ G06F 2209/5019; G06F 9/524; G06F 19/327; G06F 9/5027; G06F 9/50; G06F 9/5011; G06F 2209/503; G06Q 10/06315; G06Q 10/1097; G06Q 10/0631; G06Q 10/06
See application file for complete search history.

(56) References Cited

U.S. PATENT DOCUMENTS

| | | | | |
|---|---|---|---|---|
| 4,937,743 A | * | 6/1990 | Rassman et al. | 705/7.22 |
| 5,115,499 A | * | 5/1992 | Stiffler et al. | 711/148 |
| 5,289,370 A | | 2/1994 | Lirov | |
| 6,278,983 B1 | | 8/2001 | Ball | |
| 6,806,891 B1 | * | 10/2004 | Manuel et al. | 715/763 |
| 6,859,927 B2 | * | 2/2005 | Moody et al. | 718/100 |
| 2005/0091098 A1 | * | 4/2005 | Brodersen et al. | 705/8 |
| 2006/0224432 A1 | * | 10/2006 | Li | 705/9 |
| 2009/0150022 A1 | * | 6/2009 | McMillin et al. | 701/35 |
| 2010/0153963 A1 | * | 6/2010 | Kakarlamudi et al. | 718/105 |
| 2012/0324468 A1 | | 12/2012 | Slater et al. | |

* cited by examiner

*Primary Examiner* — Wissam Rashid
(74) *Attorney, Agent, or Firm* — Patterson + Sheridan LLP

(57) ABSTRACT

A computer (205) has at least one database (210) which contains information such as a list of tasks to be performed when manufacturing, upgrading, or servicing an aircraft, the status of the tasks, the resource listing for each task, and the configuration of the resources. When a crew (110) receives a task, the crew requests the flight deck operator FDO (150) to capture the resources listed for the task. The FDO uses a terminal (220) to query the computer to determine whether the resource is available. If available, the FDO then captures the resources for that task and configures the resource in the manner listed for that task. If a required resource has been captured for another task and is not available then the FDO can determine whether to interrupt the other task and release the resource for the assigned task.

17 Claims, 11 Drawing Sheets

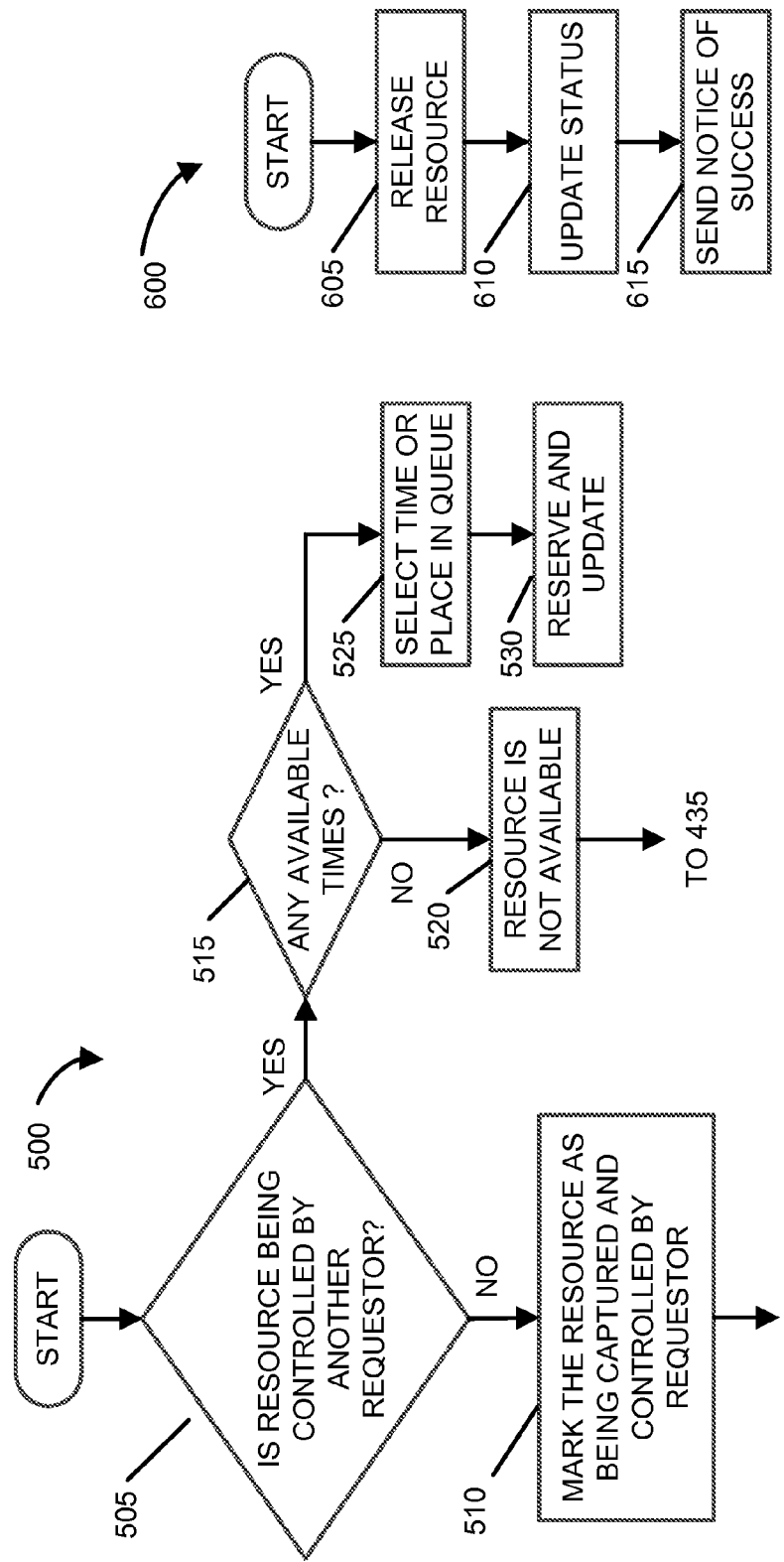

| DASHBOARD | USERS | COMMAND | STATUS | ADMIN |

| USERS | JOB / | ELPS TIME |
|---|---|---|
| J. SMITH | TROUBLESHOOTING UT2719 | 1 HR 20 MIN |
| A. RODREGUEZ | UT3401 | 1 HR 15 MIN |
| A. RODREGUEZ | TROUBLE #1 | 0 HR 20 MIN |

715

| AUTO REQ | USER STATUS | ELPS TIME |
|---|---|---|
| JS_REQ_15 | WAITING | 0 M 15 SEC |
| ATE_REQ_3 | PENDING | 1 M 05 SEC |

720

SET THE XXXXX CIRCUIT BREAKER CTXXXX ON THE P6 PANEL TO OFF

725

[COMPLETED]   [CANNOT COMPLETE]

COLLARS / TAGOUTS

AUTOMATED ALLOCATION OF VEHICLE SYSTEMS FOR DIFFERENT SPECIFIED VEHICLE TESTING TASKS

BACKGROUND

Factory floor operations during the manufacturing, maintenance, or upgrading of large, complex machines, such as but not limited to aircraft, often involve simultaneous and/or sequential multiple activities to be performed by multiple crews. One example of such factory floor operations is the flight deck operations during the manufacturing, maintenance, or upgrading of an aircraft. Each crew working on that aircraft may operate more efficiently if it has certain resources in order to perform its assigned job. A problem occurs when two different crews request that the same resource be configured differently for their respective jobs. For example, one crew may want the primary flight control system disabled so that backup flight control system can be tested and evaluated, while at the same time another crew may want the primary flight control system enabled so that a newly installed or replaced component on that primary system can be tested and evaluated. The Flight Deck Operator (FDO) is responsible for allocating and controlling the resources, and resolving conflicts over a resource. For example, the FDO would be responsible for enabling or disabling the primary flight control system based on the priority of the conflicting jobs, and would also be responsible for knowing the status of the various resources. The FDO therefore is responsible to know the current state of each resource and why (for what job) it is in that state.

If there are numerous requests for resources the FDO may become overwhelmed and forget the status of one or more resources. Also, the FDO may receive insufficient, incorrect, or untimely information as to the status of one or more resources. Further, when shifts change, it is almost impossible for an outgoing FDO to remember and then verbally, accurately, and completely communicate the status of the various jobs and resources to an incoming FDO who is responsible to accurately hear, understand, and then remember the status of each resource. Therefore, it is not unusual, when a shift change occurs, for the next crew to restart a test from the beginning, or spend time trying to determine the state of a job and the status of the resources when a previous team left. This increases the time and cost of servicing the aircraft. In addition, when a problem occurs, it is often difficult, if not impossible, to identify the status of the various related resources leading up to the time when the problem occurred so that procedures can be implemented to prevent that problem from occurring again.

SUMMARY

This Summary is provided to introduce a selection of concepts in a simplified form that are further described below in the Detailed Description. This Summary is not intended to be used to limit the scope of the claimed subject matter. Concepts and technologies described herein provide a solution for resource allocation, conflict resolution, and resource tracking.

A computer-implemented method for allocating one or more resources among tasks includes receiving a request for access to a resource or a request for access to a resource listed for performing a specified task, determining whether the resource has been captured by another task, providing a display which indicates whether the resource has been captured by another task, and if the resource has not been captured by another task then accepting a request to capture the resource and marking the status of the resource as captured by the specified task.

A system allocates one or more resources among tasks. The system has a memory device containing operating instructions and files, a processor connected to the memory device and to a communications link. The processor executes the operating instructions to receive a request for access to a resource or a request for access to a resource listed for a specified task, determine whether the resource has been captured by another task, provide a display which indicates whether the resource has been captured by another task, and if the resource has not been captured by another task then accept a request to capture the resource and mark the status of the resource as captured by the specified task.

A computer storage medium stores instructions readable by a computer. The instructions cause the computer to receive a request for access to a resource or a request for access to a resource listed for a specified task, determine whether the resource has been captured by another task, and provide a display which indicates whether the resource has been captured by another task. If the resource has not been captured by another task then the computer will accept a request to capture the resource and mark the status of the resource as captured by the specified task. If the resource has been captured by another task then the computer will determine whether the resource is being controlled by another task, provide a display which indicates whether the resource is being controlled by another task. If the resource is not being controlled by another task then the computer will accept a request to capture and control the resource and mark the status of the resource as captured and controlled by the specified task. If the resource has been captured and is being controlled by another task then the computer will determine any times when the resource is available and provide a display which indicates at least one time when the resource is available.

The features, functions, and advantages that have been discussed can be achieved independently in various embodiments of the present disclosure or may be combined in other embodiments, further details of which can be seen with reference to the following description and drawings.

BRIEF DESCRIPTION OF THE DRAWINGS

FIG. 5 is an exemplary flowchart of a process to control a resource.

FIG. 6 is an exemplary flowchart of a process to release a resource.

FIGS. 7A-7F are exemplary illustrations of a flight deck officer graphical user interface.

DETAILED DESCRIPTION

The following detailed description is directed to task management and resource allocation, conflict resolution, and tracking. In the following detailed description, references are made to the accompanying drawings that form a part hereof, and which are shown by way of illustration, specific embodiments, or examples. Like numerals represent like elements through the several figures.

Figure 1:
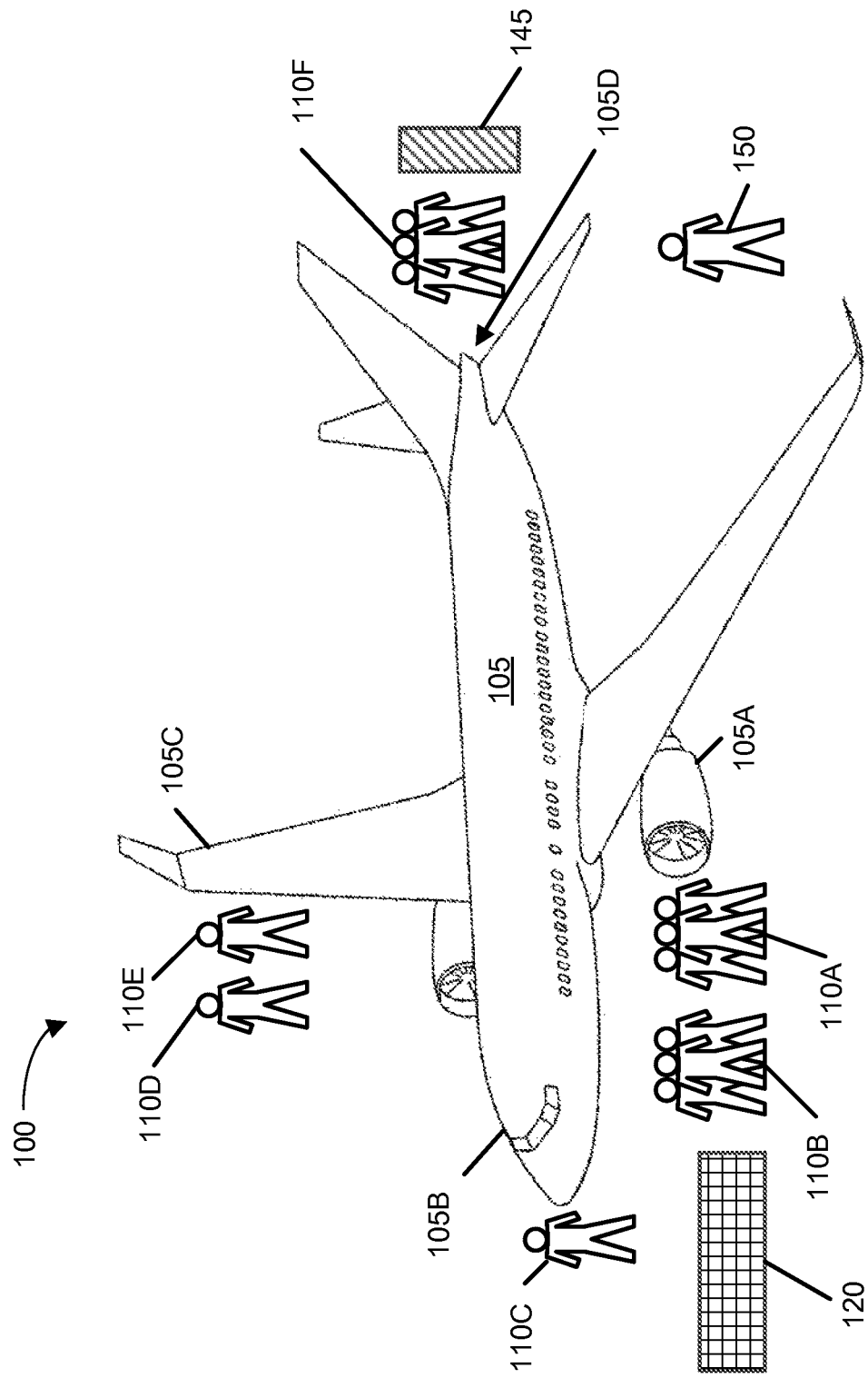
FIG. 1 is an illustration of an exemplary task management and resource allocation environment.

FIG. 1 is an illustration of an exemplary task management and resource allocation environment 100. Although the discussion herein is directed to an aircraft 105 being manufactured on the flight deck, also referred to herein as a "shop floor", the same principles are also directly applicable when an aircraft 105, or other large, complex workpiece, is being serviced or upgraded. Other examples of such large, complex workpieces are vehicles, machines, ships, cars, boats and buildings. There will often be several different crews on the flight deck, each assigned to do a different task. For example, as shown in FIG. 1, there are two crews 110A, 110B assigned to, and requesting to control, the port engine 105A for different tasks, and one of the crews has brought along automated test equipment (ATE) 120 for use in completing the installation of, or testing of, the engine 105A. In addition, a person 110C, such as but not limited to a technician or a mechanic, has been assigned to test the flight controls and so will request access to the cockpit 105B of the airplane and control of one or more of the cockpit flight controls. Further, two people 110D, 110E have been assigned to complete installation of the wing flaps and will request control of the starboard wing area 105C and hydraulic systems related thereto. Another crew 110F has been assigned a task where they will request of the rear area 105D of the aircraft. Therefore, there can be numerous conflicts regarding the configuration of the aircraft, e.g., whether the primary flight control system should be on or off, whether the electrical power source should be internal or external, etc. The various aircraft components and systems and their configurations may therefore be considered to be "resources" which are needed by the crews. It will be appreciated that if one crew takes control of a resource, that resource is generally not available for use or control by any other crew. Therefore, to efficiently manufacture an aircraft, tasks (also sometimes referred to herein as "jobs") are identified, planned, scheduled, coordinated to avoid a conflict with other tasks regarding control of resources, and assigned to a crew (also sometimes referred to herein as a "team") which is competent to perform that task. Typically, this is accomplished by a Manufacturing Execution System (MES).

Figure 2:
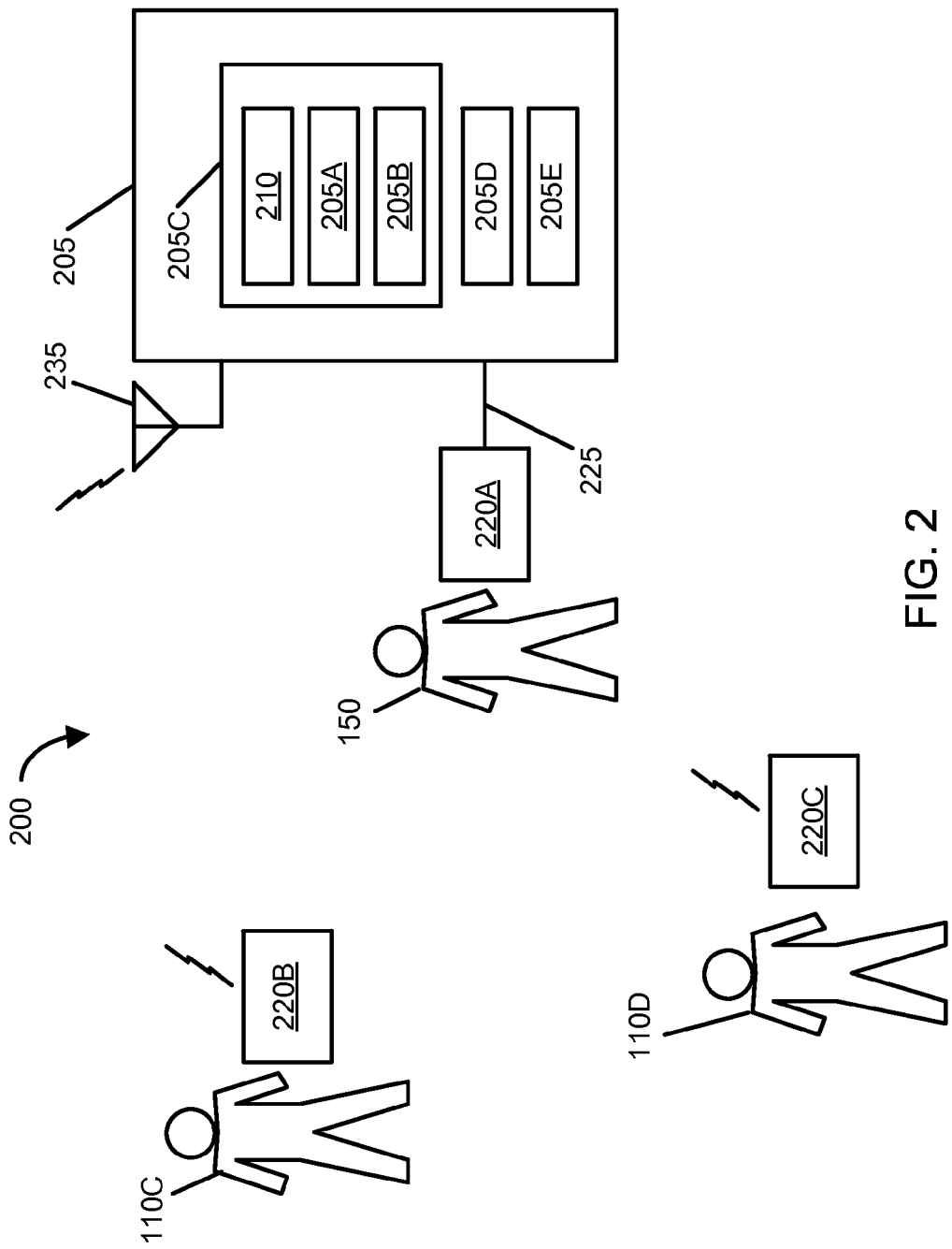
FIG. 2 is a block diagram of an exemplary task management and resource allocation system.

FIG. 2 is a block diagram of an exemplary task management and resource allocation system 200. A computer 205, which may be a server, or may include a server, or may be linked to one or more servers, or may be linked to one or more databases or other systems, may implement the MES. The computer 205 has, or has access to, a database 210 such as, or including a Vehicle State Manager (VSM) database. The computer system 205 is sometimes referred to herein as a server. The database 210 is generally, but not necessarily, a relational database. The database 210 may also be implemented as several different databases, which may be linked to each other, and/or the database 210 may be linked to other databases (not shown). One or more wired computer terminals 220A may be connected to the system 205 through a communications link 225 such as, but not limited to, wiring, and fiber optics. Also, one or more wireless computer terminals 220B, 220C communicate with the system 205 over a wireless communications link 235. The database 210 may be, but is not necessarily, part of a memory 205C. The database 210 contains the status of the aircraft, a list of the tasks that are to be performed on the aircraft 105, the status of each task, task expertise listings, crew expertise or specialty areas, the crew currently assigned to the task, a listing of resources associated with the aircraft, the resources listed for each task, the expected time needed to perform each task, the start time of a task, the status of each resource, the current configuration of each resource which can be controlled or monitored, a schedule listing the tasks in an order which avoid conflicting resource needs, etc. The resources listed for each task may range from resources which are merely desirable or useful in performing the task to resources which are required to perform the task. For example, a particular task may be done more quickly or efficiently if a particular resource is available, but can still be done even if that particular resource is not available. If such resource is not available, the system may inquire of a foreman or the FDO whether to schedule the task without that resource, or whether to delay the task until a time when that resource is available.

The memory 205C includes both nonvolatile memory 205A and volatile memory 205B, such as, but not limited to, RAM, ROM, EEPROM, disk drives, etc. The system 205 construction is conventional and includes a processor 205D, such as one or more microprocessors, which is connected to the memory 205C. The memory 205C also includes programs such as applications for reading from and writing to the databases, and operating instructions for, and which are executed by, the processor 205D. One example of an application program is the MES program. The processor 205D is also connected to other circuitry and components 205E, such as, but not limited to, data buses, input and output ports and/or devices, displays, terminals, keyboards, mice, wireless transceivers, intranet, Internet, and/or other network connections, etc.

The memory 205C may hold multiple data models of resources for different aircraft types, revision levels, resource definitions, resource availability in different countries or different areas of the same country, etc. Thus, the stored data can be used to schedule resources and to view past usage of resources to determine patterns, trends and problems. The memory 205C may contain "DNA" information for an aircraft, that is, information regarding the status of the aircraft such as, but not limited to, the state of the aircraft (e.g., available, available after routine servicing, out of service, etc.), the condition of the aircraft (e.g., recently serviced, overdue for service, scheduled for repair, etc.), the current configuration of the aircraft (e.g., switch or circuit breaker or other settings), etc. Therefore, the apparatus and methods disclosed herein are not limited to resource allocation and scheduling. Although the memory 205C is shown as being part of the system 205, portions of the memory, such as but not limited to the databases, could be separate from the system 205, and could even be in a different system.

When a crew 110 (110A, 110B, 110C, 110D, 110E, 110F) is ready for its first job on a shift, or its next job on the shift, it goes to a computer terminal 220 (220A, 220B, 220C), logs in, and requests a job. The request may be made in any format including a predetermined form and/or a Graphical User Interface (GUI) form. The computer 205 then assigns an available job to that crew based upon, for example and not by way of limitation, the area of expertise listed for that task, the area of expertise of that crew, the relative priorities of the various available jobs, the availability of resources listed for that job, the expected time to complete the job as compared to the time remaining in the current shift, etc.

If an assigned job indicates that a crew may be performing some activity on the flight deck, then the crew will contact the FDO 150 to coordinate the performance of that task on the flight deck. The computer 205 may provide to the crew a printout (not shown) describing the job to be performed, a list of the resources required for that job, and how each resource should be configured (e.g., "on", "off", "standby", etc.), the various steps to be performed for the job, etc. The crew will then go to the FDO and request control and configuration of the listed resources. The flight deck operator (FDO) 150 is on the flight deck, has the authority to control all of the actions on the flight deck, records, executes, and arbitrates actions on the flight deck. The FDO 150 will then use a terminal 220 to access the computer 205 to determine whether a resource is available or is currently being used (controlled) by another crew for a different task. If the resource is available then the FDO will "capture" that resource on the computer 205 for that task. That is, the FDO will inform the computer that the resource is now reserved for use by that particular task or crew and the computer will update the database accordingly. Once a task captures a resource, that task may maintain control of that resource until that task has been completed or that resource is no longer needed, at which point the resource is released. This provides for timely release of the resource.

If the requested resource is available then the computer system will display an approval of the request to execute the resource to the FDO on the terminal 220. The FDO will then communicate the approval to a crew member, who will advise the FDO of the resource configuration (also called a resource state) which should be implemented. Example of some configuration settings are, but are not limited to, a particular circuit breaker should be set to "off", or a particular avionics system should be set to "on", etc. The FDO will access the computer 205 to determine the current configuration of that resource. If the resource is not properly configured then the FDO can instruct the computer 205 to change the configuration of that resource if that can be done electronically, for example, by turning on the flight computer, or the FDO can instruct the computer 205 that the configuration of that resource has been changed to another configuration, and the FDO, or the crew under the direction of the FDO, will then manually configure that resource, for example, by manually turning a circuit breaker on or off, and the computer will update the database accordingly. The FDO may enter this information on the request form and the server 205 will store the pending state changes, update the history in, for example, the VSM database, and display an acknowledgement of the resource configuration to the FDO. The FDO then verbally communicates to the crew member that the requested state change has been entered and that the crew may begin the assigned task.

Using a terminal 220, the FDO can electronically submit information to update or change the state of the resources, can request the history of the use and settings of a resource, can see or enter metadata regarding a request, such as which crew made the request, when the request was made, the task or procedure the request is related to, etc. The FDO can also apply filters to this information so as to only receive and view certain information. In addition, the FDO can request a log of all successful (or unsuccessful, or pending) resource requests, the events or resources captured or controlled by a particular task, events executed recently (e.g., within the past hour; within the past 6 hours), the current state of the flight deck (e.g., what tasks are currently ongoing), how much time is expected before the task is complete, etc. This information provides several benefits. For example, if one task is interrupted for another task then, once the interrupting task has been completed, the FDO can review the information to determine the settings that were in place prior to the interruption and reconfigure the resources accordingly. This information helps to prevent an erroneous configuration setting from adversely affecting the former task when it regains control of the resource. This information is also useful in troubleshooting operations as it allows the FDO to remotely and quickly change settings so as to duplicate a potential problem. For example, the FDO may change the configurations and find that there is no problem if resource A is turned on before resource B is turned on, but a problem occurs if resource A is turned on after resource B. This helps to identify the source of the problem, such as defective component, a voltage dropout, etc.

Table I is an illustration of some exemplary information available on the status of some resources, such as, but not limited to, "aaa Circuit Breaker bbb on Panel ccc", "ddd hydraulic system for area eee", "fff hydraulic system for area ggg", "Altitude", "Attitude", and "Yaw". The letters "aaa", "bbb", etc. indicate a name, number or other identifying information for the resource, for example, "50 amp Circuit Breaker 315 on Panel K52." Other resources may not list such identifying information. For example, the resource "Altitude" may indicate an input that allows the user to override the output of the altitude sensor so that input to the aircraft flight computers is, for example, 5280 feet (1.61 kilometers) rather than the actual altitude, which may near sea level. As another example, the resource "Airspeed" may indicate an output of the airspeed sensor to that the operation of the airspeed sensor can be monitored under different environmental conditions applied by, for example, environmental simulation equipment (not shown, but see equipment 120, 145) which blows air at different speeds, pressure, temperature, etc.

The information shows the current status of the resource and, if in use, the crew that is using it, the start time, and the expected duration of use for that resource. For example, resource "aaa Circuit Breaker bbb on Panel ccc" is currently in use by crew "A" from 0900 hours for an expected duration of 2:00 hours, resource "ddd hydraulic system for area eee" is currently in use by crew "B" from 1100 hours for an expected duration of 1:30 hours, and resource "Yaw" is currently in use by crew "C" from 1030 hours for an expected duration of 1:20 hours. Therefore, when the FDO authorizes the crew to begin work on an assigned task, the resources needed are marked "in use" (and therefore not available for another job or task). When the crew advises the FDO that the job has been completed, the FDO updates the resource status to indicate that it is no longer in use and may configure the resource for the next job or may configure the resource to a default state.

The information also shows the reservation status of a resource and, if reserved, the crew or task that is using it, and the starting time of the reservation. For example, crew D wants to use both resource "ddd hydraulic system for area eee" and resource "fff hydraulic system for area ggg". Resource "ddd hydraulic system for area eee" is currently in use by another crew, B, but resource "fff hydraulic system for area ggg" is not in use so crew D could begin using it immediately. The case may be, however, that crew D is tasked with verifying the performance of one system when another system has failed, such as verifying the performance of the backup system when the primary system has failed. As crew D needs access to both resources, crew D has reserved both of those resources beginning at 1330, shortly after crew B is expected to finish its task and release the needed resource.

Table II is an illustration of some other information available from the database 210. Note that different tasks may list different numbers of resources. For example, tasks EP6 and HS23 only list one resource, task HS31 lists two resources, and task AL04 lists three resources. Also, more than one reservation may be made for a resource. Note that the resource "ddd hydraulic system for area eee" is currently in use, and has two scheduled reservations. Note that resource "fff hydraulic system for area ggg" is readily available for use for another task as long as this other task is completed by 1330, the start time of the reservation for crew D. If desired, other fields can be put in the database to indicate, by way of example and not of limitation, the name of the foreman of the crew, contact information regarding the foreman, the task to be performed by the crew, etc.

Assume, for example, that the foreman of the crew reports to the FDO that his crew has been assigned to perform task EP6. The foreman can advise the FDO of the resources needed, and/or the FDO can input the task number. The system will check the database 210 and then advise the FDO of the resource(s) needed for that task. For example, the database may have the data that the resource required for that task is "aaa Circuit Breaker bbb on Panel ccc", and that the breaker should be set to the "OFF" position. This database provides both an accuracy test and a completeness test for the resources needed. For example, the foreman may have mistakenly told the FDO that he needed resource "aaa Circuit Breaker bbb on Panel hhh" rather than Panel ccc.

If desired, other fields can be put in the database 210 to indicate, by way of example and not of limitation, other tasks that should be performed before, or after, a particular task, such as a sensor calibration, or tasks that should be subsequently performed, such as adding fluids or a fluid check, or even tests that should not be performed simultaneously because they cause, or can potentially cause, conflicts even though they use different resources.

Figure 3:
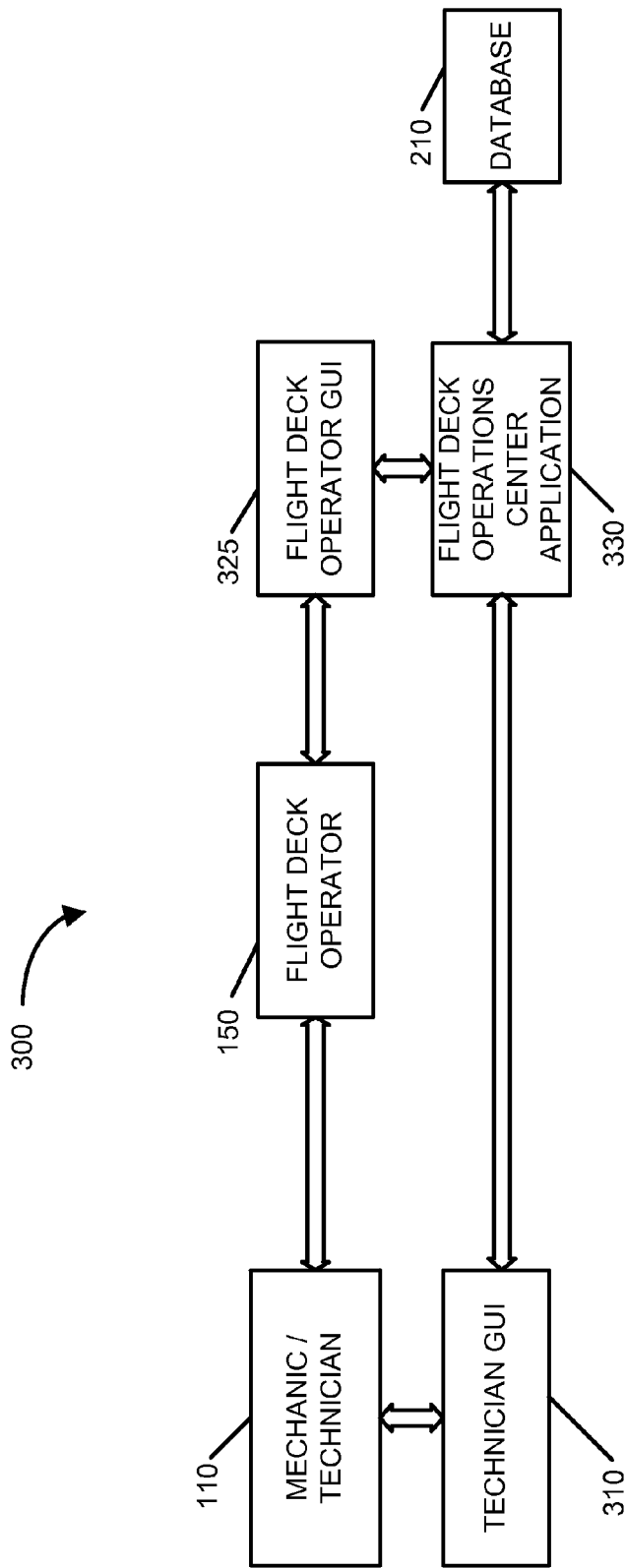
FIG. 3 illustrates an exemplary operating environment.

FIG. 3 illustrates an exemplary operating environment 300. A crew member 110, such as but not limited to a mechanic or a technician, initiates a job request assignment through a terminal 220 which has a crew member GUI 310. The crew member GUI may be similar to the FDO GUI but the crew member GUI will generally not provide as much information or as many options as the FDO GUI. The request is then sent to the flight deck operations center MES application 330 on the system 205.

The MES application 330 obtains information from the database 210 regarding the status of the resources and the aircraft 105 and provides information to the FDO 150 as to whether the request can be approved; that is, whether the requested or listed resources are available.

If the request is not approved, i.e., the resource is in use or is reserved, then the terminal, using the FDO GUI 325, would display the result of the request to the FDO. The application 330 may also display information regarding any tasks which are waiting in queue for the resource, or have reserved the resource at a future specified time. The FDO can therefore see what time the resources may be available. If the resources can be obtained in a timely manner by waiting in queue or by reserving a time, then a conflict may be avoided.

If the request is approved, i.e., the resource is not in use and/or can be reserved, then the FDO may input that task in the queue for that resource, or reserve a time for that task for the resource, and the application 330 will send an acknowledgement of same to the terminal 220 to display the result of the request to the FDO.

The FDO may also contact the technician at this time to discuss resolving any conflicts. If desired, the state of the resource may be automatically updated if the request to use is granted or if the resource has been reserved for a future time. Also, if desired, these options may be presented to the FDO, who then makes the final decision to approve or deny the request, the state of the resource is updated to reflect the FDO decision.

If the resources necessary for the task are still not available then the crew 110 will return to the terminal 220, indicate that the task cannot be performed at that time, and request another task.

The server 205 may keep a record of each request, whether or not it was granted, whether there was a conflict, any uses or reservations which created the conflict, FDO final approval, rejection, or override, parties/crews/individuals involved, which tasks had to be rescheduled and why, etc. Also, the database 210 may keep a record of when each resource request was submitted, the requesting crew and the specified task, any additional resources requested beyond those listed in the database 210, how long the task took to be completed by that crew, when the resources were released, whether the start time of a task had to be delayed while the resource was re-configured from being used with another task, the amount of time needed for the re-configuration, what non-aircraft resources (e.g., ATE resources) were used, etc. This informa-

TABLE I

| RESOURCE | IN USE | TEAM | START TIME | EXPECTED DURATION | RESERVED | TEAM | PRIORITY | START TIME | EXPECTED DURATION |
|---|---|---|---|---|---|---|---|---|---|
| aaa Circuit Breaker bbb on Panel ccc | Y | A | 0900 | 2:00 | | | | | |
| ddd hydraulic system for area eee | Y | B | 1100 | 1:30 | Y | D | 4 | 1330 | 2:00 |
| | | | | | Y | E | 3 | 1900 | 3:30 |
| fff hydraulic system for area ggg | | | | | Y | D | 4 | 1330 | 4:00 |
| Altitude | | | | | | | | | |
| Attitude | | | | | | | | | |
| Yaw | Y | C | 1030 | 1:20 | | | | | |
| Airspeed | | | | | | | | | |

TABLE II

| TASK | RESOURCE LISTING A | RESOURCE LISTING B | RESOURCE LISTING C |
|---|---|---|---|
| EP6 | Set aaa Circuit Breaker bbb on Panel ccc to "OFF" | | |
| HS23 | Turn ddd hydraulic system for area eee to "OFF" | | |
| HS31 | Turn ddd hydraulic system for area eee to "ON" | Turn fff hydraulic system for area ggg to "OFF" | |
| AL04 | Set Altitude to hhh feet (meters) | Set Attitude to iii degrees | Set Yaw to jjj degrees | tion allows for later data analysis to determine how to manage and improve flight deck operation efficiency, identify bottlenecks in resource allocation and job completion, the status of the vehicle at each point in the construction, repair or upgrading process, etc.

Using a terminal 220, the FDO, and possibly a crew member 110, such as a technician or a senior level technician, can obtain information on an aircraft 105 and resources including information on the status and configuration of resources, request history, information in the databases as mentioned above, metadata on the request, e.g. who requested, time, procedure command is attached to, etc., and see "filtered" views of control/requests, e.g., by resource, by task, by date, by crew, etc. Through the terminal 220, the FDO can also request a log of all the successful requests executed through the flight deck operations center, i.e., the application 330, and events executed only for a specific job, events executed recently, the current state of the aircraft to identify what tests or tasks may be ongoing and how much time is left on each of them, etc. When a task has been completed, or prior to a task beginning, the application 330 may automatically reconfigure certain resources on the airplane for the next scheduled task or to a default state. For example, the application 330 may automatically configure the aircraft radar system to shut down.

On occasion, however, it will take longer to complete a task than originally scheduled, or a task cannot be completed as scheduled because a component is missing or is defective, or an installed system does not operate properly, so the crew is assigned to another task while awaiting a replacement component or troubleshooting by another team. The scenario may thus change in an unplanned manner: a crew may be available earlier or later for its next task and request the resources for its next task sooner or later than expected; a troubleshooting team may request access to that resource and possibly other resources in order to determine the problem and how it can be resolved; and/or the original crew or another crew may return later to the original task to finish the installation and/or testing and so will request that resource again. These events can cause conflicts even where there previously was no conflict. If such a problem develops then the FDO can readily take steps to reschedule and/or reprioritize the various tasks and resources so as to keep the overall process as close to being on schedule as possible. The application 330 may also display recommended steps and/or procedures to implement in order to correct the problem. For example, in the event that the cockpit ventilation system does not operate, the application 330 may suggest checking one or more particular circuit breakers, one or more fluid systems, etc. The technician or the FDO can then use the terminal 220 to check off each procedure as it is performed. This is particularly helpful on systems where there are numerous components to be checked and it may be difficult to remember which ones were checked and the state of each.

Figure 4:
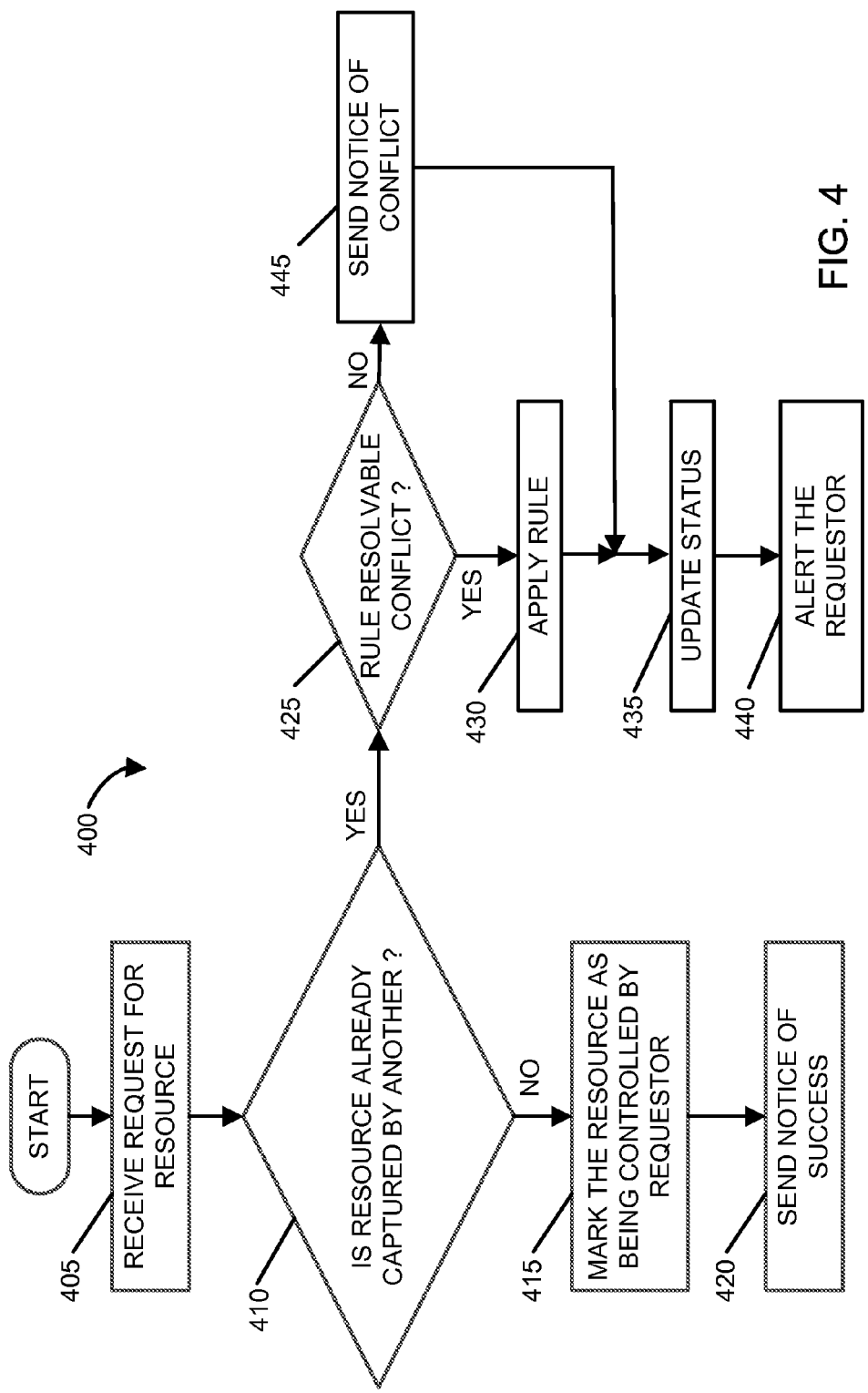
FIG. 4 is an exemplary flowchart of a process to capture a resource.

As illustrated in the flowcharts of FIGS. 4-6, parts of the procedure discussed above may be viewed as being in one of three different categories: (1) Capture the Resource; (2) Control the Resource; and (3) Release the Resource. FIG. 4 is an exemplary flowchart of a process 400 to capture a resource. Upon receiving 405 a request for a resource from the FDO the system checks the database to determine whether the resource has already been captured by another crew or task. If not then the database is updated 415 to mark the resource as being controlled by the requestor, i.e., the relevant task or assigned crew. A notice of success of the request to capture the resource is then sent 420 to the FDO.

If, however, at 410, the resource has been captured but not released then the system checks the conflicts rules in the database to determine whether the conflict is a rule-resolvable conflict. If so then the rule is applied 430, the status of the resource is updated 435, and a notice of the status is sent 440 to the FDO, who can then communicate the result to the crew member. Applying the rule 430 may result in either the request being denied, in which case the status is updated 435 and the FDO is notified 440 of the denial, or in the request being approved, in which case the status 435 is updated and the FDO is notified 440 of the approval.

If at 425 the conflict is not rule-resolvable, then a notice of the conflict is sent 445 to the FDO. The FDO can then make a decision as to which crew or task has the higher priority. Once that decision is made the FDO inputs that decision into the system and steps 435 and 440 are then performed.

FIG. 5 is an exemplary flowchart of a process 500 to control a resource. If at 410 the resource has been captured then the system checks 505 the database to determine whether the resource is currently being controlled by the crew or task which previously captured the resource. If the resource has been captured and is currently being controlled then the system checks 515 whether there are any available times for that resource. If not, then the resource is not available 520. A return is then made to step 435 wherein the status is updated and the requestor is notified 440 of the denial. If the resource has been captured, but is not currently being controlled, then it is available to the requesting resource. Therefore, the resource is marked 510 as being captured and controlled by the requestor. A return is then made to step 415 where the database is updated to mark the resource as being controlled by the requestor and a notice of success of the request to capture the resource is sent 420. Also, at 420, the party previously having captured the resource, but who was not then currently controlling the resource, will be divested of the right to control the resource and will be notified of that event. If at 515 there are available times then the system displays to the FDO the available times to the FDO, and the FDO then makes a selection 525 of a time or a reservation.

FIG. 6 is an exemplary flowchart of a process 600 to release a resource. Once a crew has finished a task and no longer needs the resource, the resource should be released so that it can be marked available for other tasks which may be waiting for the resource. A crew member may notify the FDO that the task has been completed and there is no longer any need for the resource, or that a portion of the task has been completed and the remaining portion of the task does not require that resource. The FDO may then use his terminal 220 to notify the system to release 605 the resource. The system will then update 610 the status of the resource to show that it has been released and is now available, or possibly that it has now been assigned to another task which had been waiting. The system then sends 615 a notice of success which advises the FDO that the request was received and executed. The FDO may then acknowledge to the crew member that the release of the resource has been accomplished.

Figure 7A:
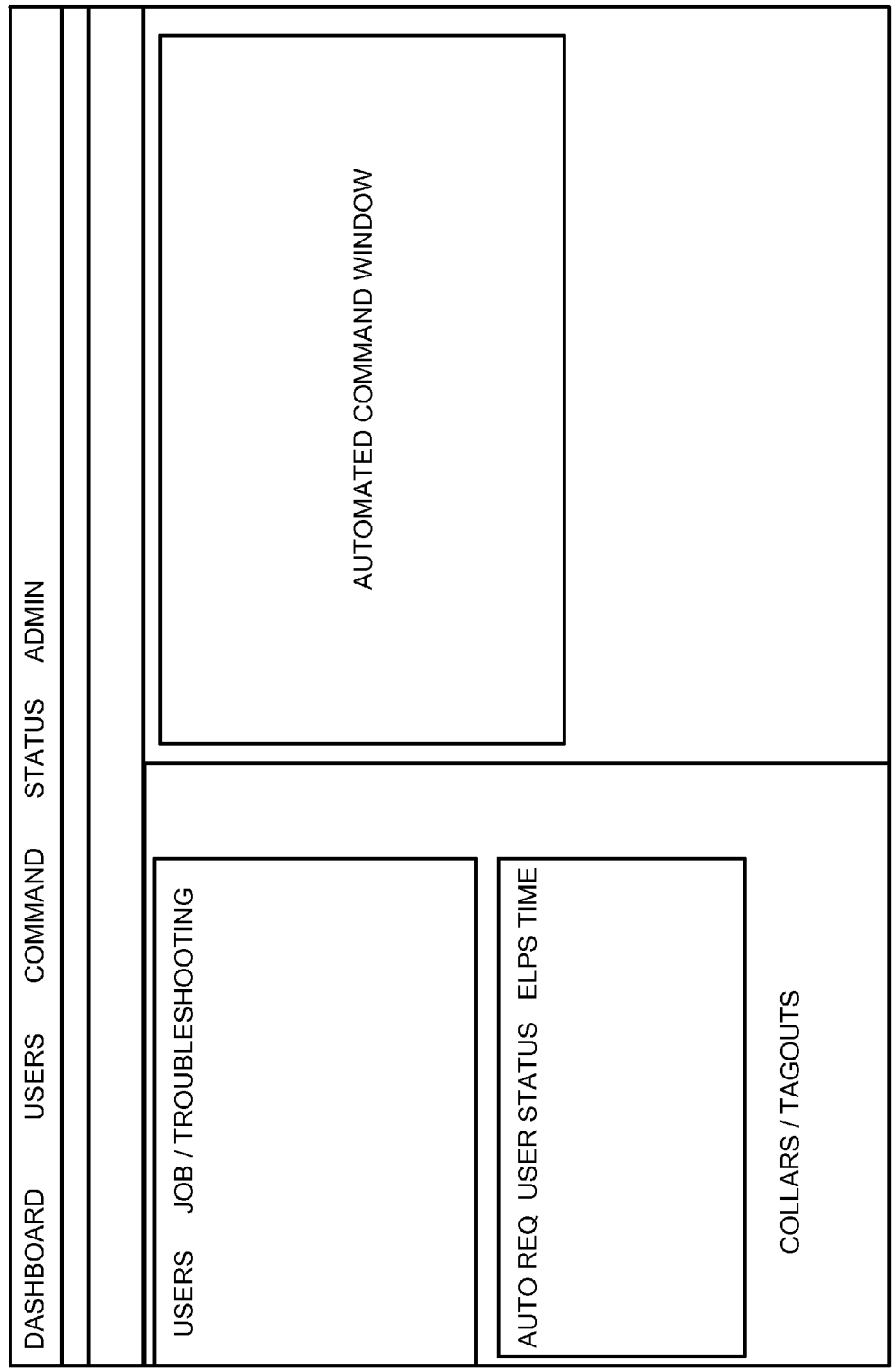

FIGS. 7A-7F are exemplary illustrations of an FDO GUI 325. The FDO may, using the GUI and a terminal 220, configure certain resources to be managed based upon the airplane model, submodel, tail number, or task. The system 205 may, based upon the GUI selections, provide the information to the factory or maintenance network system, and may also provide information on resource usage at the aircraft level to the production or maintenance system for record keeping purposes or for future analysis and planning purposes. FIG. 7A is an exemplary initial or startup screen for the FDO 150.

Figure 7B:
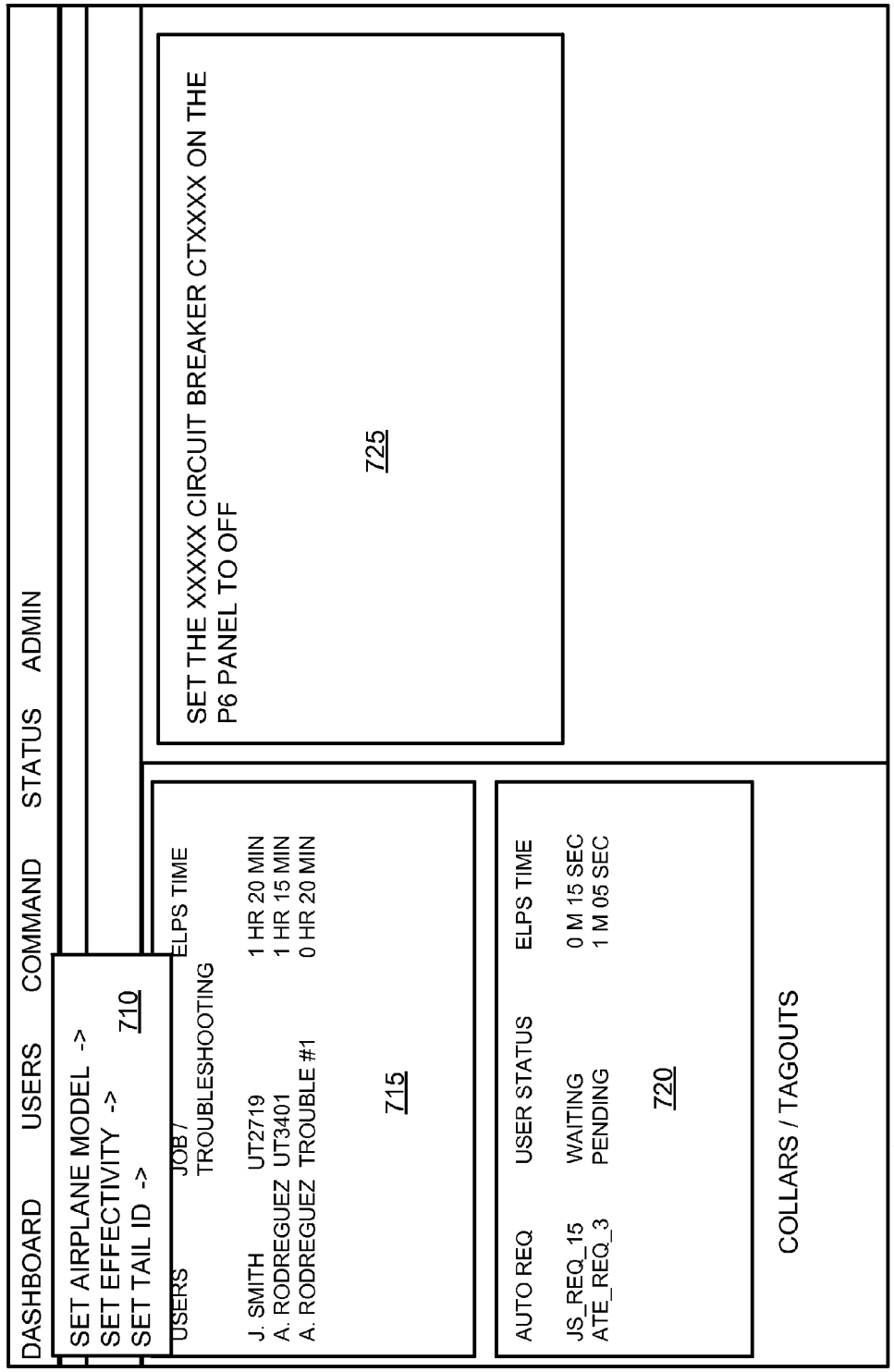

FIG. 7B is an illustration of an exemplary dropdown menu 710 allowing the user, typically the FDO, to input information on the job to be performed. Also shown, by way of example and not of limitation, are some current users, tasks, and the status of the tasks 715, some pending automated requests and their status 720, and information regarding the configuration needed 725 for a particular task, in this case, the lowest task on the display, ATE_REQ_3.

FIG. 7C is an exemplary illustration of providing and updating the status of a task. The FDO can process requests from the mechanics or technicians performing the installation or service work. The requests may be via voice, such as by radio or by face-to-face communication. The dashboard provides a view of who is working with systems resources and the job numbers active on the aircraft, along with the time elapsed for each job. If a technician has to move to troubleshooting a system another screen is brought up to collect the requests and other information for potential future use in troubleshooting problems. Automated commands may come into the system 205 and be denoted in, for example, the left midsection of the dashboard. An automated test system (ATE) request may enter a "pending" queue if the request is something that should be performed, but has not yet been performed, or there is a conflict which prevents it from being performed. If the request is something that can be performed automatically, that is, by the server and without the need of human intervention, then the request may be executed immediately by the server, or as soon as there is no conflict, and the status of that request and that resource is recorded. Note that ATE3_REQ_3 is pending, and the needed configuration setting is "Set The XXXXX Circuit Breaker CTXXXX On The P6 Panel To Off". The FDO is waiting for the technician to orally advise that the requested configuration setting has been accomplished, or cannot be accomplished. Alternatively, the technician may have the authority to log in and indicate the status of the configuration setting. If the technician is successful in setting the configuration, the FDO clicks on the "Completed" box, which may indicate that the configuration needed for the particular task has been set and the task can proceed, or that the reconfiguration at the end of the particular task has been set so that the next task can access the resource. If, however, the technician is not successful and advises that the configuration setting cannot be made, then the FDO clicks on the "Cannot Complete" box. This could be due to, for example, a previous user having left a lock on the circuit breaker, or the circuit breaker snapping back to OFF each time the technician turns it on. This may indicate a problem to be reported and repaired, a delay in the completion of another task, forgetfulness on the part of the technician who placed the lock on the circuit breaker, etc. This result, "Completed" or "Cannot Complete", is also logged and, preferably, if the result is "Cannot Complete", then the FDO requests that a repair crew be assigned to the problem, or the system 205 may automatically report the problem and request that a repair crew be assigned. The system 205 may also automatically cancel and/or reschedule all tasks which required use of the resource that failed.

Figure 7D:
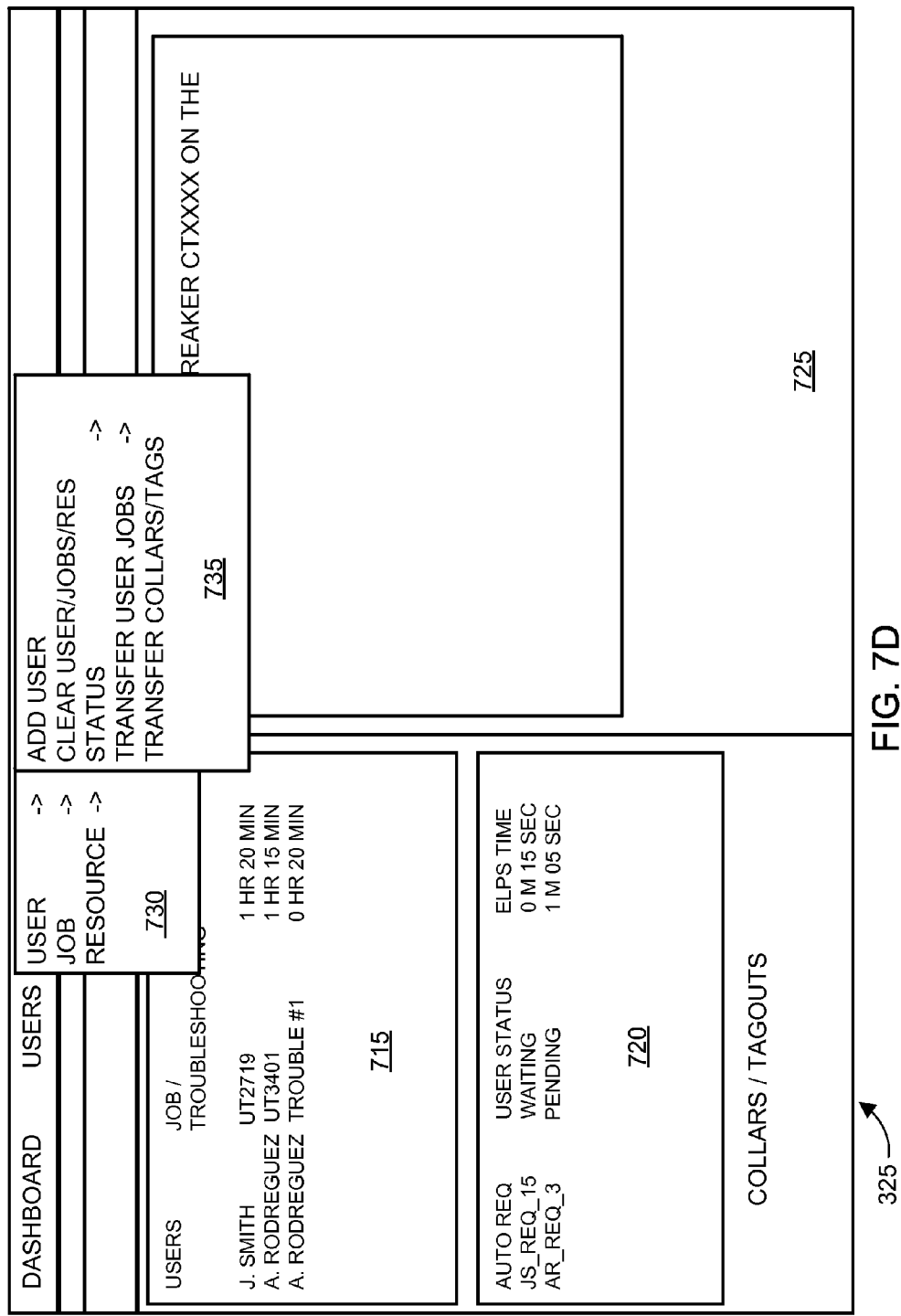

FIG. 7D illustrates an exemplary GUI in a non-automated mode wherein the FDO receives the request and processes commands or instructions such as adding a user, a new job, or a troubleshooting session to the system 205. After the requests for configuring the aircraft have been performed, and the job has been performed, and the status of the aircraft is to be updated, then the FDO can manually identify and clear job resource assignments, troubleshooting jobs, etc. Also, if a job is to be transferred to another shift or team, such as when a shift change occurs, the system 205 can automatically transfer the responsibility for the job to another crew. For example, clicking on the "USERS" heading or tab causes a dialog box or drop down menu 730 to appear which allows selection of the USER, the JOB, or the RESOURCE. In the example shown, the FDO has selected the USER option, which causes another dialog box or drop down menu 735 to appear, whereby the FDO can add a user, clear a user or job or result, check a status, transfer the user to another job, transfer collars or tags to another job, etc.

Figure 7E:
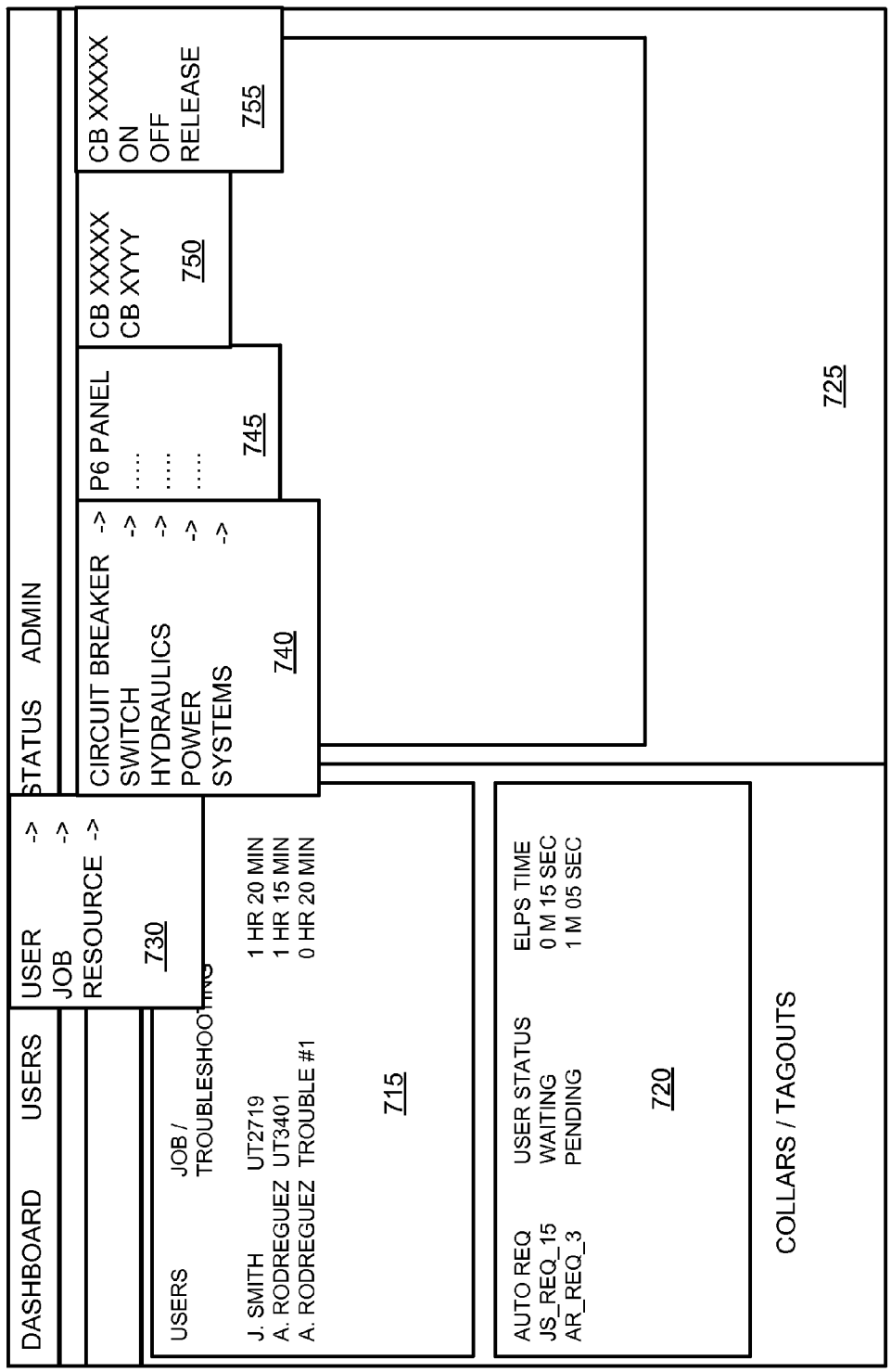

FIG. 7E illustrates an exemplary GUI whereby the FDO can make a request of a resource, such as but not limited to a circuit breaker, switch, simulation mode, etc., for a job. The FDO may perform one of two main actions: capture or release. The capture action makes the requesting mechanic or job to be the "owner" or the resource. This capture action may be a prerequisite to running a test or procedure or performing a job which lists that resource as being in a particular state. This ensures that the necessary resources are available and configured to support the task. The capture or release, and state, are recorded in the table 210 and may be logged or recorded elsewhere for historical information for later use. For example, from box 730 the FDO has selected the "RESOURCE" option, which causes dialog box or menu 740 to appear, whereby the resource type can be selected. The "CIRCUIT BREAKER" resource was selected, which causes dialog box or menu 745 to appear, whereby the location ("PANEL") of the circuit breaker can be specified. This causes box or menu 750 to appear, whereby the particular circuit breaker can be selected, in this case, CB XXXXX. This then causes box or menu 755 to appear, whereby the circuit breaker can be set to the ON position or the OFF position, or RELEASE if the need for that resource is no longer present. If the resource can be directly controlled by the system 205 then the system 205 will set the resource as specified unless the system 205 detects a conflict from a job currently using the resource. If the resource cannot be set by the system 205 then the GUI of FIG. 7C may appear, where the FDO orally instructs the mechanic or technician to set the circuit breaker to the desired position and awaits notice that the circuit breaker has been set as specified. The aircraft may have numerous test points which allow the system 205 to monitor the status of the various aircraft resources and, in that case, the system 205 may indicate to the FDO that the circuit breaker has been properly set. It is possible for the system 205 to automatically check the "COMPLETED" box in FIG. 7C once the system 205 detects that the circuit breaker setting is as specified. The FDO can also narrow the view to show only pending tasks, or only pending tasks for a particular resource or resources. This allows the FDO to determine whether to place a task in queue for the resource, reserve the resource at an available future time, or institute a conflict resolution process.

Figure 7F:
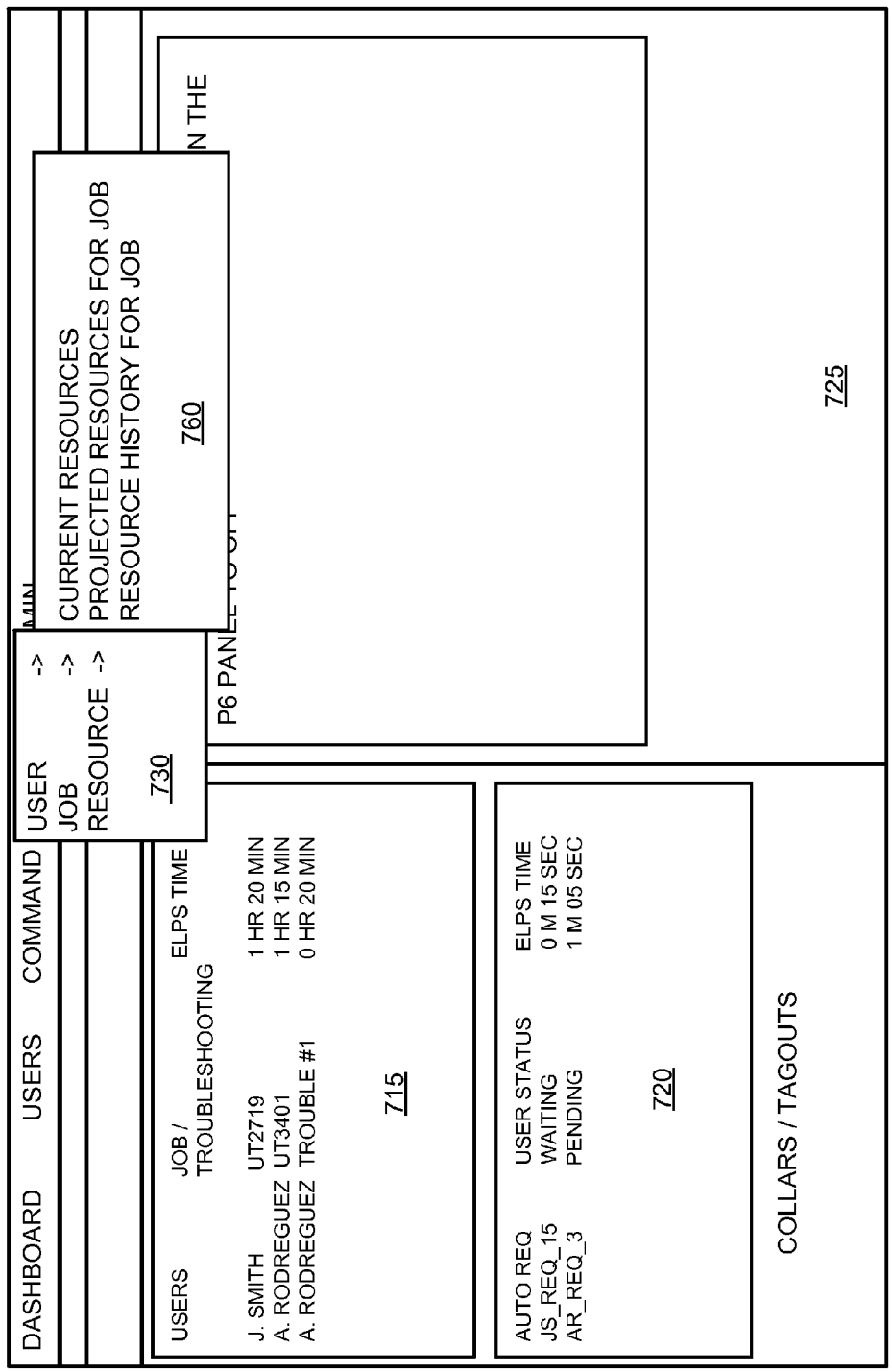

FIG. 7F illustrates an exemplary GUI whereby an FDO can view the status of the aircraft via the requests for resources associated with that aircraft. The view can be focused based upon filters, users, jobs, or resources, and can be based on the current state of the aircraft, the previous or historical state, or projected future needs. This view also allows the FDO to look ahead in time for possible future conflicts, for a user being scheduled for two different jobs at the same time, for one of a particular resource having a waiting list while another of that same resource has no users or reservations, etc.

The computer 205 also provides for the use of automated testing. For example, the computer 205 may send control signals to the aircraft electronics to turn certain functions or devices on or off, and may monitor an output signal or line to verify that the aircraft electronics performed the action correctly. If not, the computer 205 may automatically generate a task for troubleshooting the problem. If a task involves the use of ATE then, once the crew has installed the ATE, reported the installation to the FDO, and the FDO checked a box on the FDO GUI indicating that the ATE has been installed, then the computer 205 may take control of the ATE, and any necessary resources, perform the tests using the ATE, and record the results of the ATE procedure. When performing ATE tests, the computer 205 captures the resource as soon as it is available, and releases the resource as soon as the test requiring that resource has been completed. Thus, the FDO does not need to become involved with allocating resources for automated testing. Alternatively, the computer 205 may display, to the FDO, the resources listed for each step of automated testing, and the FDO can indicate to the computer whether the resource is available. This allows the FDO to maintain control of the resources.

Generally, assignment of tasks and the configuration of resources is an automated procedure in that identification of the task automatically brings up an identification of the resources required for the task. When, however, as mentioned above, a problem occurs during the performance of a task, a manual mode of operation may be used. A crew member will report the problem to the FDO. The FDO may then use a terminal 220 to directly inquire as to the status of a resource, check the configuration of a resource, and change the configuration of the resource, so as to assist the crew in determining the nature of the problem and a solution to the problem, such as identifying a defective component and replacing it. For example, referring to FIG. 7E, the FDO may use menu 730 to select "Resource", and then use the menus 740, 745, 750, 755 to identify and/or control the necessary resources. These events are also recorded by the computer 205 for possible future analysis.

By way of example, and not limitation, computer storage media may include volatile and non-volatile, removable and non-removable media implemented in any method or technology for storage of information such as computer-readable instructions, data structures, program modules or other data. For example, computer storage media includes RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the processor 205D. For purposes of the claims, the phrase "computer storage medium", and variations thereof, excludes waves and transitory signals per se, that is, the phrase "computer storage medium", and variations thereof, excludes waves and signals without any associated device for the transmission, reception, detection, processing, or storage of the wave or transitory signal.

According to various embodiments, the system may operate in a networked environment using logical connections to remote computers and/or servers through a wired or wireless network. The terminals 220 and user input/output devices may include a keyboard, mouse, touchscreen, touchpad, keypad, or electronic stylus, a display screen, a printer, or other type of output device, and the user input and output features may be embodied in the same component, such as a touch-sensitive screen.

The programs and operating instructions, when executed by the processor 205D, transform the system 205 and the overall computer architecture thereof from a general-purpose computing system into a special-purpose computing system customized to facilitate the functionality presented herein. The processor 205D may be a single processor, or may be a plurality of processors.

Encoding the software presented by way of flowcharts herein also may transform the physical structure of the computer-readable media presented herein. The specific transformation of physical structure may depend on various factors, in different implementations of this description. Examples of such factors may include the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, many types of physical transformations take place in the computer architecture in order to store and execute the software components presented herein. Also, the computer architecture may include other types of computing devices, including hand-held computers, embedded computer systems, personal digital assistants, and other types of computing devices known to those skilled in the art. It is also contemplated that the computer architecture may not include all of the components shown herein, may include other components that are not explicitly shown herein, or may utilize an architecture completely different than that shown herein.

Based on the foregoing, it should be appreciated that a solution to resource allocation, conflict resolution, and resource tracking has been disclosed herein. It is to be understood that the appended claims are not necessarily limited to the specific features, configurations, acts, or media described herein. Rather, the specific features, configurations, acts and mediums are disclosed as example forms of implementing the claims.

"Includes", "including", and "such as", as used herein, are open-ended and are not limited to the just the terms listed therewith. The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A computer-implemented method for allocating one or more vehicle systems among a first specified vehicle testing task and a second specified vehicle testing task and another specified vehicle testing task, the method comprising:

maintaining a database which lists information associated with the one or more vehicle systems;

receiving a request to display at least some specified information on one of the one or more vehicle systems;

retrieving the specified information regarding the vehicle system from the database;

providing a display which indicates the specified information for the vehicle system;

receiving a request for access to the vehicle system for the first specified vehicle testing task;

determining whether the vehicle system has been captured by the second specified vehicle testing task or the another vehicle system testing task;

providing a display which indicates whether the vehicle system has been captured by the second specified vehicle testing task;

upon determining that the vehicle system has not been captured by the second specified vehicle testing task, accepting a request to capture the vehicle system and marking a status of the vehicle system as captured by the first specified vehicle testing task;

upon determining that the vehicle system has been captured by the second specific vehicle testing task:

receiving a vehicle system status indicating that the second specified vehicle testing task has released the vehicle system;

upon receiving the vehicle system status, providing access to the vehicle system for the first specified vehicle testing task;

outputting an instruction to configure a state of the vehicle system for the first specified vehicle testing task; and providing a display which indicates that the first specified vehicle testing task can capture the vehicle system; and upon determining that the vehicle system has been captured by the another vehicle testing task:

determining whether the vehicle system is being controlled by the another specified vehicle testing task and providing a display which indicates whether the vehicle system is being controlled by the second specified vehicle testing task; and determining any times when the vehicle system is available, providing a display which indicates at least one time when the vehicle system is available, and accepting a request to reserve the vehicle system for a specified time and marking the status of the vehicle system as reserved by the specified vehicle testing task.

2. The computer-implemented method of claim 1 and wherein, if there is not at least one time when the vehicle system is available then providing a display which indicates that the vehicle system is not available.

3. The computer-implemented method of claim 1 and further comprising maintaining a database which lists vehicle systems, whether the vehicle systems have been captured by the another vehicle testing task, and whether the vehicle system is currently being used by the another vehicle testing task.

4. The computer-implemented method of claim 1 wherein the information comprises identification of tasks which have previously captured the vehicle system.

5. The computer-implemented method of claim 1 wherein the information comprises a listing of a current configuration of the vehicle system.

6. The computer-implemented method of claim 5 wherein the information further comprises a listing of previous configurations of the vehicle system.

7. The computer-implemented method of claim 1 and further comprising:

maintaining a database of vehicle testing tasks;

maintaining a database which indicates the vehicle systems listed for a vehicle testing task;

receiving a request to assign the specified vehicle testing task;

retrieving information regarding the vehicle systems listed for the specified vehicle testing task from the database; and providing a display which indicates the vehicle systems listed for the specified vehicle testing task.

8. The computer-implemented method of claim 1 wherein at least one vehicle testing task is to be performed on an aircraft and at least one of the vehicle systems is associated with the aircraft.

9. A system to allocate one or more vehicle systems among a first specified vehicle testing task and a second specified vehicle testing task and another specified vehicle testing task the system comprising a server, the server comprising:

a memory device containing operating instructions and files;

a processor, communicatively coupled to the memory device and to a communications link, the processor executing the operating instructions to:

maintain a database which lists information associated with the one or more vehicle systems;

receive a request to display at least some specified information on one of the one or more vehicle systems;

retrieve the specified information regarding the vehicle system from the database;

provide a display which indicates the specified information for the vehicle system;

receive a request for access to the vehicle system for a first specified vehicle testing task;

determine whether the vehicle system has been captured by a second specified vehicle testing task or the another vehicle system testing task;

provide a display which indicates whether the vehicle system has been captured by the second specified vehicle testing task;

upon determining that the vehicle system has not been captured by the second specified vehicle testing task, accept a request to capture the vehicle system and mark a status of the vehicle system as captured by the first specified vehicle testing task;

upon determining that the vehicle system has been captured by the second specified vehicle testing task:

receive a vehicle system status indicating that the second specified vehicle testing task has released the vehicle system;

upon receiving the vehicle system status, providing access to the vehicle for the first specified vehicle testing task;

output an instruction to configure a state of the vehicle system for the first specified vehicle testing task; and providing a display which indicates that the first specified vehicle testing task can capture the vehicle system; and upon determining that the vehicle system has been captured by the another vehicle testing task:

determining whether the vehicle system is being controlled by the another specified vehicle testing task and providing a display which indicates whether the vehicle system is being controlled by the second specified vehicle testing task; and determining any times when the vehicle system is available, providing a display which indicates at least one time when the vehicle system is available, and accepting a request to reserve the vehicle system for a specified time and marking the status of the vehicle system as reserved by the specified vehicle testing task.

10. The system of claim 9 wherein, if there is not at least one time when the vehicle system is available, the server is further operative to provide a display which indicates that the vehicle system is not available.

11. The system of claim 9 wherein the server is further operative to:
maintain a database which lists vehicle systems, whether the vehicle systems have been captured by another vehicle testing task, and whether the vehicle system is currently being used by another vehicle testing task.

12. The system of claim 9 wherein the server is further operative to maintain a database which lists information regarding vehicle systems, the information comprising identifications of vehicle testing tasks which have previously captured the vehicle system.

13. The system of claim 9 wherein the server is further operative to maintain a database which lists information regarding vehicle systems, the information comprising a listing of a current configuration of the vehicle system.

14. The system of claim 9 wherein the server is further operative to maintain a database which lists information regarding vehicle systems, the information comprising a listing of a current configuration of the vehicle systems and a listing of previous configurations of the vehicle systems.

15. The system of claim 9 wherein at least one vehicle testing task is to be performed on an aircraft and at least one of the vehicle systems is associated with the aircraft.

16. A computer storage medium having computer-readable instructions stored thereupon which when executed by a computer, cause the computer to:
maintain a database which lists information associated with the one or more vehicle systems;
receive a request to display at least some specified information on one of the one or more vehicle systems;
retrieve the specified information regarding the vehicle system from the database;
provide a display which indicates the specified information for the vehicle system;
receive a request for access to the vehicle system for a first specified vehicle testing task;
determine whether the vehicle system has been captured by a second specified vehicle testing task or by another vehicle system testing task;
provide a display which indicates whether the vehicle system has been captured by the second specified vehicle testing task;
upon determining that the vehicle system has not been captured by the second specified vehicle testing task, accept a request to capture the vehicle system and mark a status of the vehicle system as captured by the first specified vehicle testing task;
upon determining that the vehicle system has been captured by the second specified vehicle testing task:
receive a vehicle system status indicating that the second specified vehicle testing task has released the vehicle system;
upon receiving the vehicle system status, provide access to the vehicle system for the first specified vehicle testing task;
output an instruction to configure the state of the vehicle system for the first specified vehicle testing task; and
provide a display which indicates that the first specified vehicle testing task can capture the vehicle system; and
upon determining that the vehicle system has been captured by the another vehicle testing task:
determine whether the vehicle system is being controlled by the another specified vehicle testing task and providing a display which indicates whether the vehicle system is being controlled by the second specified vehicle testing task; and
determine any times when the vehicle system is available, providing a display which indicates at least one time when the vehicle system is available, and accepting a request to reserve the vehicle system for a specified time and marking the status of the vehicle system as reserved by the specified vehicle testing task.

17. The computer storage medium of claim 16 wherein at least one vehicle testing task is to be performed on an aircraft and at least one of the vehicle systems is associated with the aircraft.

* * * * *